(12) United States Patent
Dinsdale et al.

(10) Patent No.: US 11,377,059 B2
(45) Date of Patent: Jul. 5, 2022

(54) SUBTOTAL ENCLOSURES FOR AIRBAG ASSEMBLIES

(71) Applicant: Autoliv ASP, Inc., Ogden, UT (US)

(72) Inventors: Charles Paul Dinsdale, Farr West, UT (US); Don Larry Parker, Syracuse, UT (US); Derek John Wiscombe, Morgan, UT (US); Adam Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 86 days.

(21) Appl. No.: 16/827,378

(22) Filed: Mar. 23, 2020

(65) Prior Publication Data

US 2021/0291775 A1 Sep. 23, 2021

(51) Int. Cl.
*B60R 21/215* (2011.01)
*B60R 21/207* (2006.01)
(52) U.S. Cl.
CPC .......... *B60R 21/215* (2013.01); *B60R 21/207* (2013.01)
(58) Field of Classification Search
CPC .................... B60R 21/215; B60R 21/207
See application file for complete search history.

(56) References Cited

U.S. PATENT DOCUMENTS

| | | | |
|---|---|---|---|
| 5,799,971 A | 9/1998 | Asada | |
| 5,863,063 A | 1/1999 | Harrell | |
| 6,612,610 B1 | 9/2003 | Aoki et al. | |
| 7,690,723 B2 * | 4/2010 | Evans | B60N 2/58 297/216.13 |
| 9,463,768 B2 * | 10/2016 | Tanabe | B60R 21/215 |
| 10,059,297 B2 * | 8/2018 | Tanabe | B60R 21/2334 |
| 2005/0225059 A1 | 10/2005 | Lewis et al. | |
| 2007/0063490 A1 | 3/2007 | Minamikawa | |
| 2008/0217892 A1 | 9/2008 | Maripudi et al. | |
| 2008/0284142 A1 | 11/2008 | Cheal et al. | |
| 2010/0052295 A1 | 3/2010 | Fukawatase et al. | |
| 2012/0001405 A1 | 1/2012 | Kim | |
| 2013/0113190 A1 | 5/2013 | Schneider et al. | |
| 2014/0375024 A1 | 11/2014 | Osterfeld | |
| 2015/0115580 A1 | 4/2015 | Gould et al. | |
| 2017/0021793 A1 * | 1/2017 | Ito | B60N 2/986 |
| 2020/0062206 A1 | 2/2020 | Jacobsen | |

FOREIGN PATENT DOCUMENTS

| | | | |
|---|---|---|---|
| DE | 19731729 | | 1/1998 |
| DE | 19826511 | | 12/1998 |
| DE | 29917942 | | 2/2000 |
| DE | 102016010530 A1 * | | 3/2018 .......... B60R 21/215 |
| JP | 1143001 | | 2/1999 |
| JP | 2000335347 | | 12/2000 |
| JP | 2007076642 A * | | 3/2007 ............. B60N 2/686 |
| WO | 2020046552 | | 3/2020 |

OTHER PUBLICATIONS

International Search Report and Written Opinion dated Jun. 9, 2021 for international application PCT/US2021/017991.

* cited by examiner

*Primary Examiner* — Faye M Fleming
(74) *Attorney, Agent, or Firm* — Foley & Lardner LLP (57) ABSTRACT

Subtotal enclosures for inflatable airbag assemblies are disclosed that preserve a packaged state of the inflatable airbag assembly and that may be installed beneath or behind a seat covering material whereby "read-through" of the inflatable airbag assembly through the seat covering material is limited.

19 Claims, 5 Drawing Sheets

FIG. 6 under the US 11,377,059 B2

SUBTOTAL ENCLOSURES FOR AIRBAG ASSEMBLIES

TECHNICAL FIELD

The present disclosure relates generally to the field of automotive protective systems. More particularly, the present disclosure relates to airbag assemblies, such as side airbag assemblies and, more particularly, to covers (or enclosures) and mounting systems for side airbag assemblies that are configured to deploy in response to collision events.

BACKGROUND

Protection systems have been installed in vehicles to protect an occupant during a collision event. Some protection systems include inflatable side airbags. Some protection systems suffer from one or more drawbacks, or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Occupant protection systems, such as inflatable airbag assemblies, may be installed at various locations within a vehicle to reduce or minimize occupant injury during a collision event. Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors, within or adjacent to seats, adjacent to a roof rail of the vehicle, in an overhead position, or at the knee or leg position. An enclosure for an inflatable airbag assembly may dictate, or limit, installation locations within a vehicle, as well as impacting costs for production of the inflatable airbag assembly, or installation of the inflatable airbag assembly, or both. In the following disclosure, "airbag" generally refers to an inflatable airbag that deploys to protect an occupant during a collision event.

The present disclosure is directed to side airbag assemblies that are configured to deploy to protect an occupant during a side collision event, including an oblique side collision event. More particularly, the present invention is directed toward covering, or enclosing, side airbag assemblies in a packaged state and mounting side airbag assemblies to a vehicle. An enclosure or cover for a side airbag assembly may significantly affect where the side airbag assembly may be installed to a vehicle, or may require particular consideration in designing overlying or adjacent components of the vehicle to ensure proper function of the side airbag assembly during a side collision event or an oblique side collision event.

During installation, airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors. An airbag assembly can mitigate injury to an occupant of a vehicle during a collision event by reducing the effect of impact of the occupant against structures (body-structure impact) within the vehicle (such as, e.g., a dashboard or door column).

Some embodiments disclosed herein can provide improved positioning, cushioning, and/or safety to occupants involved in particular types of collisions. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap frontal crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1): 172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

Figure 1:
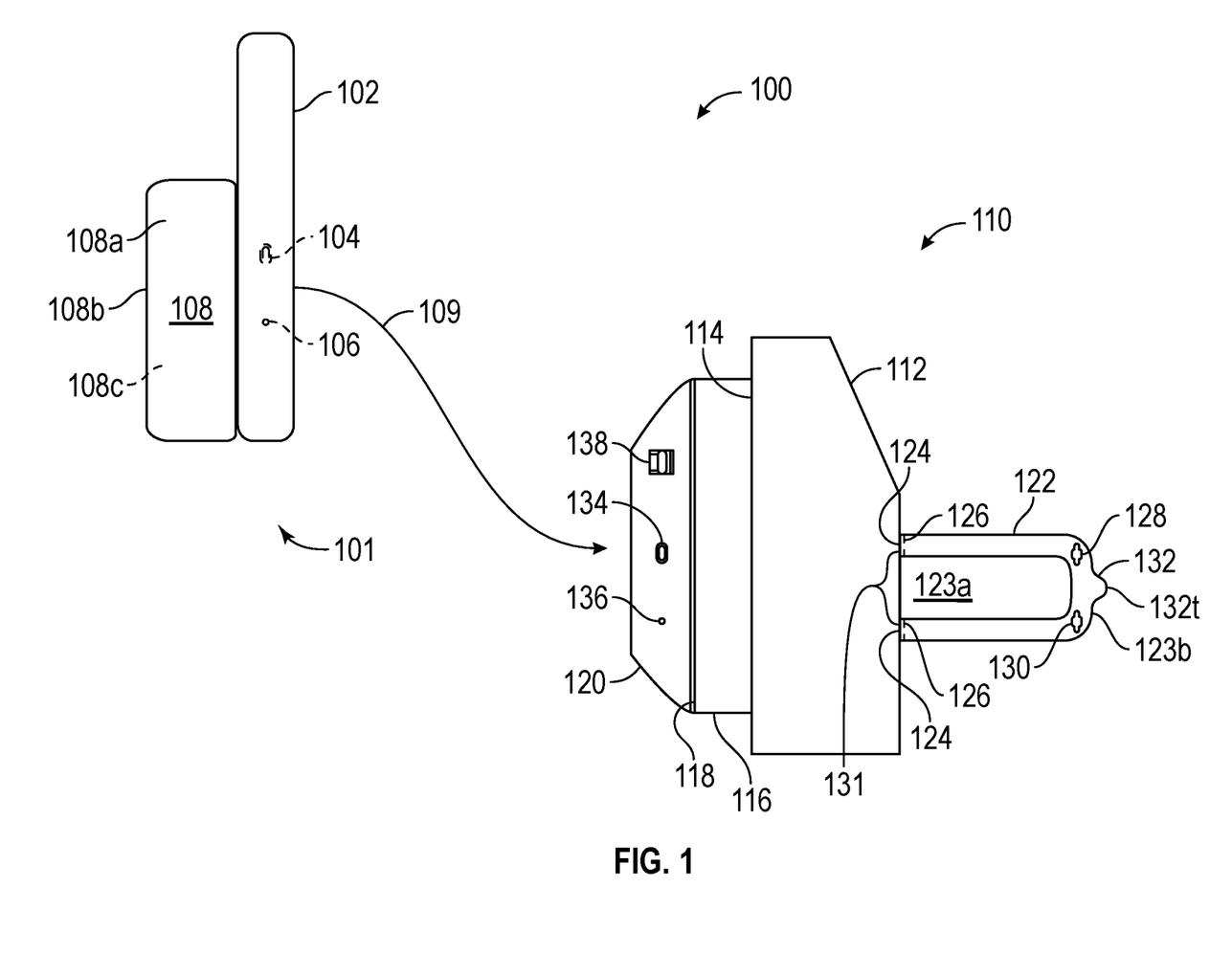
FIG. 1 is a side view of at least a portion of an inflatable side airbag assembly, according to an embodiment of the present disclosure, and in a partially assembled state.

FIG. 1 is a plan view of at least a portion of an inflatable side airbag assembly 100, according to an embodiment of the present disclosure, and in a partially assembled state. The inflatable side airbag assembly 100 comprises an inflator 102, an inflatable airbag cushion 108, and a cover (hereafter, "subtotal enclosure") 110. One or more of the inflatable airbag cushion 108 and the inflator 102 may, at least partially define, an inflatable airbag module 101 to be enclosed by the subtotal enclosure 110. The subtotal enclosure 110 comprises a lateral panel 112, a rear panel 116, a mounting panel 120, and a closure 122. The subtotal enclosure 110 is illustrated in a plan view, with the lateral panel 112, the rear panel 116, and the mounting panel 120 laid flat (e.g., in the same plane) to show a relative interrelation of these elements, whereas FIGS. 2A, 2B, and 2C discussed below depict more fully an orientation of these elements relative to each other. A first coupling 114 couples between the lateral panel 112 and the rear panel 116. A second coupling 118 couples between the rear panel 116 and the mounting panel 120. A third coupling 124 couples between the lateral panel 112 and the closure 122.

The closure 122, in the present embodiment, is defined by a panel having a shape generally like a "U" (comprising a counter 123a opposite a bowl 123b) on its side. The bowl 123b of the "U" shape defines a distal end 132 of the closure 122. In one embodiment, the distal end 132 may be further defined by a tab 132t that may be used to facilitate assembling together the subtotal enclosure 110, the inflator 102, and the inflatable airbag cushion 108. The third coupling 124 couples a first end 131 (defined by the counter 123a (open portion) of the "U" shape) to the lateral panel 112 such that the counter 123a abuts the lateral panel 112 and the bowl 123b is distal to the lateral panel 112. In one embodiment, the closure 122 may be a panel without the counter 123a and having a first end 131 opposite the distal end 132. In one embodiment, the distal end 132 may be more or less rounded than the bowl 123b shown in FIG. 1. The closure 122 can comprise a sacrificial fail point 126 that is configured to burst, rupture, or otherwise separate the closure 122 from the lateral panel 112 at or near the third coupling 124 during deployment of the inflatable airbag cushion 108. By way of example without limitation, the sacrificial fail point 126 may be formed of a row of perforations, application of a weakening impression, use of a particular fabric bias, or any other appropriate means. The sacrificial fail point 126 may be disposed at or proximal to the third coupling 124 and is generally parallel to the third coupling 124. The sacrificial fail point 126 generally spans that portion (or portions) of the closure 122 where the sacrificial fail point 126 is disposed.

The closure 122 may function as a flexible wrapper about at least a portion of the inflatable airbag cushion 108 in a packaged state. The closure 122 may be configured to releasably secure the inflatable airbag cushion 108 to at least one of the lateral panel 112 and the mounting panel 120. Said otherwise, the closure 122 may close about the inflatable airbag cushion 108 to retain the inflatable airbag cushion 108 at and at least partially between the lateral panel 112 and the mounting panel 120 until the inflatable side airbag assembly 100 is deployed. The closure 122 may be configured to decouple at the sacrificial fail point 126 to permit deployment of the inflatable airbag cushion 108. The first coupling 114 and/or the second coupling 118 may comprise a flexible fold configured to permit the lateral panel 112 to articulate outward away from the mounting panel 120.

In one embodiment, the lateral panel 112, the rear panel 116, the mounting panel 120, and the closure 122 may be formed as a unitary component from a contiguous material. In such an embodiment, the first, second, and third coupling 114, 118, 124 may be formed by folding, bending, impressing, or any other suitable manner. In one embodiment, one or more of the panels 112, 116, 120 or the closure 122 may be formed of a first material and one or more of the panels 112, 116, 120 or the closure 122 formed of a second material. For example, the lateral panel 112, rear panel 116, and mounting panel 120 may be formed of a first material, and the closure 122 may be formed of a second material. In such an embodiment, the first and second couplings 114, 118 may be formed by folding, bending, impressing, etc., and the third coupling 124 may be formed by sewing, adhesive, radio-frequency (RF) welding, or another appropriate method. In another embodiment, the lateral panel 112 and the closure 122 may be formed of a first material, and the rear panel 116 and the mounting panel 120 may be formed of a second material. In yet other embodiments, other combinations of first and second material sourcing for each of the lateral panel 112, rear panel 116, mounting panel 120, and the closure 122 are anticipated by the present disclosure. Furthermore, each of the first, second, and third couplings 114, 118, 124 may be formed by cutting, sewing, adhesive, RF welding, or another suitable method, regardless of whether the two panels/closure coupled by the particular coupling 114, 118, 124 are formed of the same material or disparate materials. Additionally, material may be selected for each panel 112, 116, 120 and the closure 122 to provide a preferred degree of rigidity, flexibility, or pliability. In other words, each panel 112, 116, 120, may have distinctive qualities of rigidity, flexibility, and pliability; and the closure 122 may have a degree of rigidity, flexibility, and pliability similar to that of any of the panels 112, 116, 120, or may be more flexible or pliant, or both. In one embodiment, for example, the mounting panel 120 may be more rigid than one or more of the rear panel 116, the lateral panel 112, and the closure 122. In one embodiment, the closure 122 may be more rigid than one or more of the panels 112, 116, 120.

Furthermore, a thickness of material may vary as among the panels 112, 116, 120 and the closure 122. In one embodiment all the panels 112, 116, 120 and the closure 122 are formed of the same material and one or more panels may employ a thicker instance of the material. By way of example without limitation, the mounting panel 120 and the rear panel 116 may be formed of material A having a thickness of X, the lateral panel 112 and the closure 122 may be likewise formed of material A but having a thickness of Y; or the material A of the closure 122 may have a thickness of Z. Similarly, and without limitation, the mounting panel 120 may be formed of material A having a thickness of M, with the rear panel 116 formed of material A having a thickness of N, the lateral panel 112 formed of material B having a thickness of P, and the closure 122 formed of material B having a thickness of Q. Other combinations of materials and thicknesses are anticipated by the present disclosure. Each such combination may serve to provide a particular degree of rigidity for the particular panel 112, 116, 120 and the closure 122 while employing a minimal amount of material to accomplish the purpose of each panel 112, 116, 120 and the closure 122, as may be appropriate in the particular application.

In the embodiment of FIG. 1, the inflator 102 comprises a first inflator stud 104 and a second inflator stud 106. The inflator studs 104, 106 may be referred to or known as a mounting component. The first and second inflator studs 104, 106 may be configured to mount the inflator 102 to a vehicle (e.g., the vehicle 1 of FIG. 3). The mounting panel 120 comprises a first inflator stud aperture 134 and a second inflator stud aperture 136. The closure 122 also comprises a first inflator stud aperture 128 and a second inflator stud aperture 130. The inflator 102 may be mated 109 to the subtotal enclosure 110 by coupling the inflator stud 104 through the first inflator stud aperture 134, and the inflator stud 106 through the second inflator stud aperture 136 of the mounting panel 120. The mounting panel 120 further comprises a spacer 138 that is configured to abut against a portion of the inflator 102 to assist in proper disposition of the inflator 102 and the mounting panel 120 relative to one another.

Assembly of the subtotal enclosure 110 with the inflator 102 and the inflatable airbag cushion 108 may be accomplished by coupling the inflator 102 to the mounting panel 120 as previously described, and with the inflatable airbag cushion 108 disposed adjacently as shown in FIG. 1, or similarly disposed. The subtotal enclosure 110 may be articulated at the second coupling 118 upward (out of the page toward the viewer of FIG. 1) whereby the rear panel 116 is substantially orthogonal to the mounting panel 120. The subtotal enclosure 110 may be further articulated at the first coupling 114 whereby the lateral panel 112 is substantially orthogonal to the rear panel 116 and substantially parallel to the mounting panel 120 while overlying the coupled inflator 102 and the inflatable airbag cushion 108. The subtotal enclosure 110 may be further articulated at the third coupling 124 whereby the closure 122 is drawn across an outboard lateral portion 108a of the inflatable airbag cushion 108, wrapped around a forward portion 108b of the inflatable airbag cushion 108, then drawn across an inboard lateral portion 108c of the inflatable airbag cushion 108 and the inflator 102 to permit coupling of the two inflator stud apertures 128, 130 at the inflator studs 104, 106, respectively. With respect to mating 109 the closure 122 with the inflator 102 and the inflatable airbag cushion 108, "outboard lateral portion" refers to a portion of the inflatable airbag cushion 108 disposed in a direction of deployment of the inflatable airbag cushion 108, and "inboard lateral portion" refers to a portion of the inflatable airbag cushion 108 opposite the "outboard lateral portion." With the inflator 102, the inflatable airbag cushion 108, and the subtotal enclosure 110 mated 109 together, the side inflatable airbag assembly 100 may be substantially ready for mounting to a vehicle.

Figure 2A:
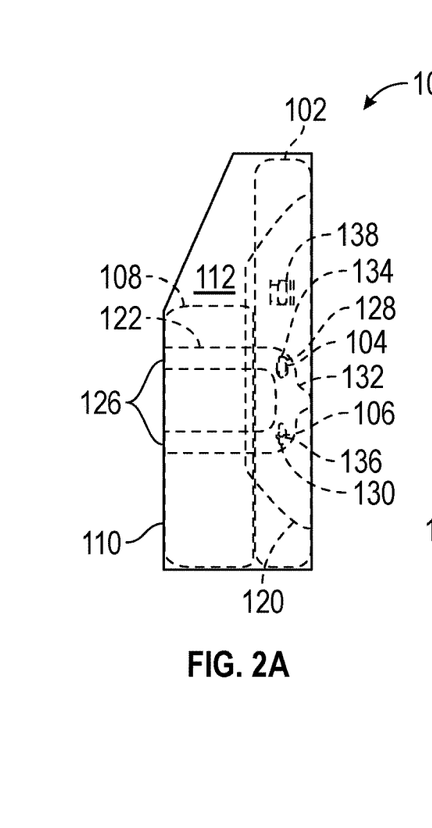
FIG. 2A is a side view of the side inflatable airbag assembly of FIG. 1 in a substantially assembled state.

FIG. 2A is a side view of the side inflatable airbag assembly 100 of FIG. 1 in a substantially assembled state. The inflator 102 and the inflatable airbag cushion 108 are in a packaged state within the cover or subtotal enclosure 110. As viewed in FIG. 2A, the mounting panel 120 is in the same position as seen in FIG. 1. The subtotal enclosure 110 is shown mated 109 with the inflator 102 and the inflatable airbag cushion 108 as in the manner previously described. The lateral panel 112 is visible, and a portion of the closure 122 and the distal end 132 of the closure 122 are shown. The first inflator stud 104 is disposed through the first inflator stud aperture 134 of the mounting panel 120 and the first inflator stud aperture 128 of the closure 122. The second inflator stud 106 is disposed through the second inflator stud aperture 136 of the mounting panel 120 and the second inflator stud aperture 130 of the closure 122. As shown in FIG. 2A, the side inflatable airbag assembly 100 may be in a state ready for installation to a vehicle, packaged and/or protected by the cover or subtotal enclosure 110.

The side inflatable airbag assembly 100, as shown in FIG. 2A, may be in a state substantially ready for installation (e.g. mounting) to a seat of a vehicle. The inflator 102 and the inflatable airbag cushion 108 are within the subtotal enclosure 110. With the subtotal enclosure 110 fully mated 109 (see FIG. 1) to the inflator 102 and the inflatable airbag cushion 108, both the inflator 102 and the inflatable airbag cushion 108 are only partially covered; however the inflator 102 and the inflatable airbag cushion 108 may be fixedly coupled to each other by the subtotal enclosure 110 during installation to a vehicle and during operation of the vehicle until occurrence of an event, such as a collision event, initiates deployment of the inflatable airbag cushion 108 from the subtotal enclosure 110.

Figure 2B:
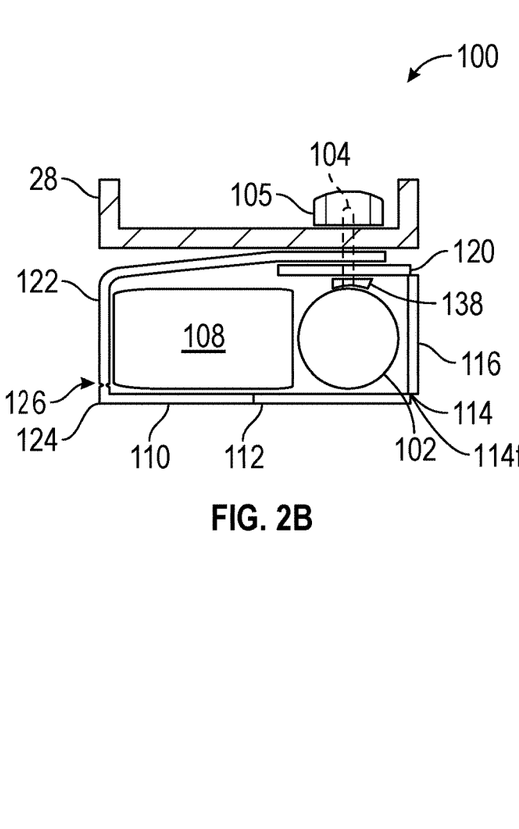
FIG. 2B is a top view of the side inflatable airbag assembly of FIGS. 1 and 2A mounted to a portion of a vehicle.

FIG. 2B is a top view of the side inflatable airbag assembly 100 of FIGS. 1 and 2A mounted to a portion of a vehicle. The inflator 102 and the inflatable airbag cushion 108 are shown for reference and are within a cover or subtotal enclosure 110. The subtotal enclosure 110 is shown with the lateral panel 112, the rear panel 116, the mounting panel 120, and the closure 122 wrapped about the inflator 102 and the inflatable airbag assembly 108. The sacrificial fail point 126 is disposed near an edge of the lateral panel 112. That is, sacrificial fail point 126 is adjacent the third coupling 124. In the embodiment of FIG. 2B, the first coupling 114 may define a flexible fold 114f that is a bend or fold that disposes the lateral panel 112 and the rear panel 116 orthogonally (or near orthogonally) to each other. In the embodiment of FIG. 2B, during mating of the inflator 102 to the subtotal enclosure 110, the first inflator stud 104 was mated first to the mounting panel 120, and the closure 122 was then mated to the first inflator stud 104. The second inflator stud (see the second inflator stud 106 in FIG. 1) was also mated to, respectively, the mounting panel 120 and the closure 122. The side inflatable airbag assembly 100 may then be mounted to a portion of a vehicle. In the present instance, the side inflatable airbag assembly 100 may be mounted to a frame 28 of a seat of a vehicle (see the seat 12 and the vehicle 1 in FIG. 3) by passing a portion of the first inflator stud 104 and the second inflator stud 106 through corresponding apertures of the frame 28. A mounting nut 105 is applied to each of the first and second inflator studs 104, 106 to secure the side inflatable airbag assembly 100 to the vehicle 1. Reciting in order from the inflator 102 to the mounting nut 105, the order of components is first the inflator 102 with the spacer 138, the mounting panel 120, the closure 122, the frame 28, and the mounting nut 105.

The rear panel 116 and the lateral panel 112 may be configured to remain coupled to each other during deployment, with the rear panel 116 configured to remain coupled at the frame 28 throughout deployment of the inflatable side airbag assembly 100. The closure 122 may be configured to separate at the sacrificial fail point 126 during deployment, with a first portion of closure 122 remaining coupled to the lateral panel 112 and a second portion of the closure 122 remaining coupled to inflatable side airbag assembly 100 via the inflator stud apertures of the closure 122 engaged upon the studs of the inflator 102 (see the inflator stud apertures 128, 130 and inflator studs 104, 106 in FIGS. 1 and 2A).

Figure 2C:
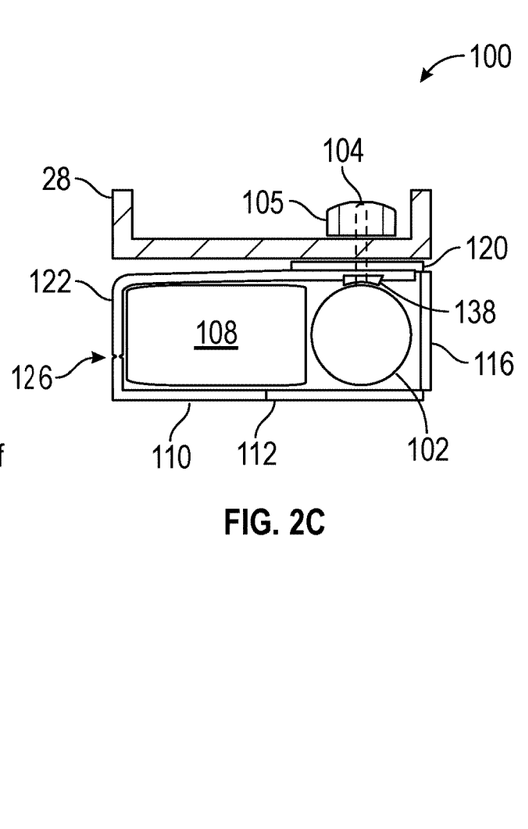
FIG. 2C is a top view of the side inflatable airbag assembly of FIGS. 1 and 2A mounted to a portion of a vehicle.

FIG. 2C is a top view of the side inflatable airbag assembly 100 of FIGS. 1 and 2A mounted to a portion of a vehicle. The inflator 102 and the inflatable airbag cushion 108 are shown for reference and are within the cover or the subtotal enclosure 110. The subtotal enclosure 110 is shown, with the lateral panel 112, the rear panel 116, the mounting panel 120, and the closure 122 wrapped about the inflator 102 and the inflatable airbag cushion 108. In the embodiment of FIG. 2C, the inflator 102 is mated 109 to the subtotal enclosure 110 in a similar fashion as described in conjunction with FIG. 2B with the exception that the inflator 102 is first mated 109 to the closure 122, then the mounting panel 120 before being mounted to the frame 28 of the seat 12. Thus, reciting from the inflator 102 to the mounting nut 105, the order of components is the inflator 102 with the spacer 138, then the closure 122, the mounting panel 120, and the mounting nut 105. The mounting nut 105 may be attached to the first inflator stud 104 to mount the side inflatable airbag assembly 100 to the frame 28 of a seat 12 of the vehicle 1. In the embodiment of FIG. 2C, the sacrificial fail point 126 of the closure 122 is disposed a distance away from the third coupling 124.

Figure 3:
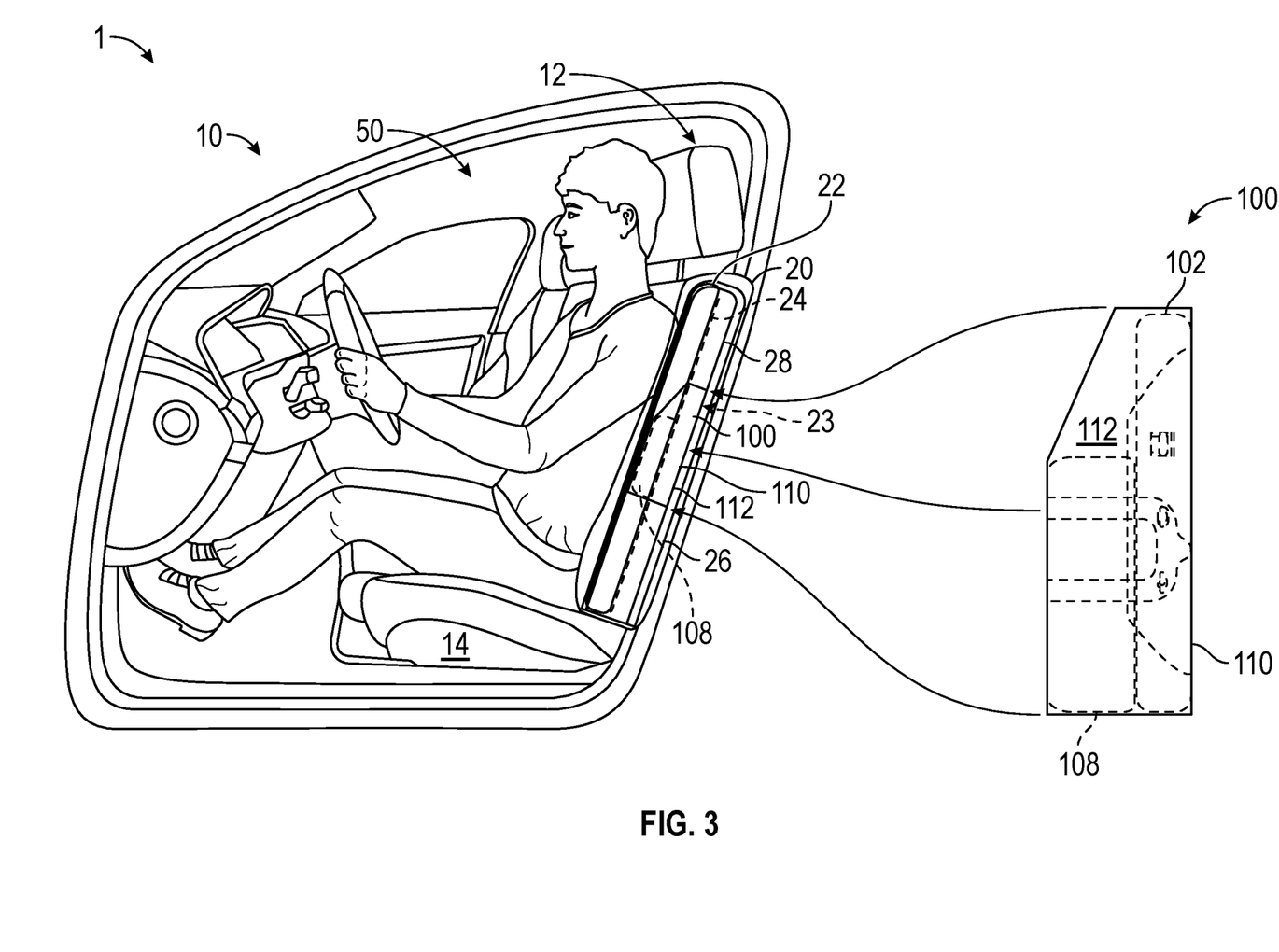
FIG. 3 is a side view of a portion of a vehicle having a side inflatable airbag assembly according to an embodiment of the present disclosure.

FIG. 3 is a side view of a portion of a vehicle 1 having a side inflatable airbag assembly 100 according to an embodiment of the present disclosure. The vehicle 1 comprises a vehicle occupant position 10 that is defined by a seat 12. The vehicle occupant position 10 may be configured to accommodate an occupant 50 of the vehicle 1 during normal operation (e.g., traveling, parked, etc.) of the vehicle 1. The vehicle occupant position 10 may be configured to accommodate an occupant 50 seated in the seat 12 that defines the vehicle occupant position 10. The seat 12, for example, comprises a seat base 14 and a seat back 20 configured to accommodate the occupant 50. The seat back 20 may comprise a void 23 to receive an inflatable side airbag assembly such as the side inflatable airbag assembly 100 of FIGS. 1-2C. At the right in FIG. 3, an enlarged side inflatable airbag assembly 100 is shown for ease of reference and orientation, and corresponding to the side inflatable airbag assembly 100 shown installed to the seat 12 of the vehicle 1. The subtotal enclosure 110, with the lateral panel 112 toward the viewer, as well as the inflator 102 and the inflatable airbag cushion 108 in a packaged state are shown. Arrows indicate positioning of the side inflatable airbag assembly 100 to the seat 12. The lateral panel 112 may be configured to define or provide an outward facing surface comprising a material with a degree of rigidity and a degree of elasticity (as discussed in conjunction with FIG. 1). In other words, the side inflatable airbag assembly 100 may be disposed at the seat 12 with the lateral panel 112 facing outward (toward the viewer of FIG. 3).

The seat 12 is shown in a cutaway illustration for convenience of the present description. The installed side inflatable airbag assembly 100 is shown, with inflator 102, the inflatable airbag cushion 108 in a packaged state, and the subtotal enclosure 110 (in particular, the lateral panel 112) shown for reference. The seat back 20 may comprise a foam filler 22, or a filler 22 of another material. The filler 22 may define or otherwise comprise a void 23 disposed adjacent to a portion of the frame 28 to accommodate the side inflatable airbag assembly 100. The seat back 20 further comprises a seat back spring 24 that may be configured to support the occupant 50. The seat back 20 also comprises the frame 28 to support the seat back 20, various components of the seat back 20, and the occupant 50. The seat back 20 may be covered with a seat cover 26 suitable to the purpose. For FIG. 3, the seat cover 26 is omitted from a portion of the seat back 20 toward the viewer. With the side inflatable airbag assembly 100 mounted or otherwise installed to the seat back 20, the lateral panel 112 may be disposed facing an outer lateral surface of the seat 12 and to cover the void 23 in the seat 12. In other words, the lateral panel 112 faces and supports an inner surface of a portion of the seat cover 26 whereby visual detection of the presence the inflatable side airbag assembly 112 is mitigated, reduced, or eliminated. Furthermore, the lateral panel 112 may be configured to at least partially articulate outwardly away from the mounting panel (see the mounting panel 120 in FIGS. 1-2C) to deploy permit the inflatable airbag cushion 108 to deploy from the void 23 in the seat back 20.

While the description in conjunction with FIG. 3 is directed toward a left-side seat 12 (and a driver seat 12) of the vehicle 1, the present disclosure anticipates that the side inflatable airbag assembly 100 herein described may be similarly used with a right-side seat. More particularly, the side inflatable airbag assembly 100 may be disposed at either a right side of a seat 12 or at a left side of a seat 12.

Figure 4:
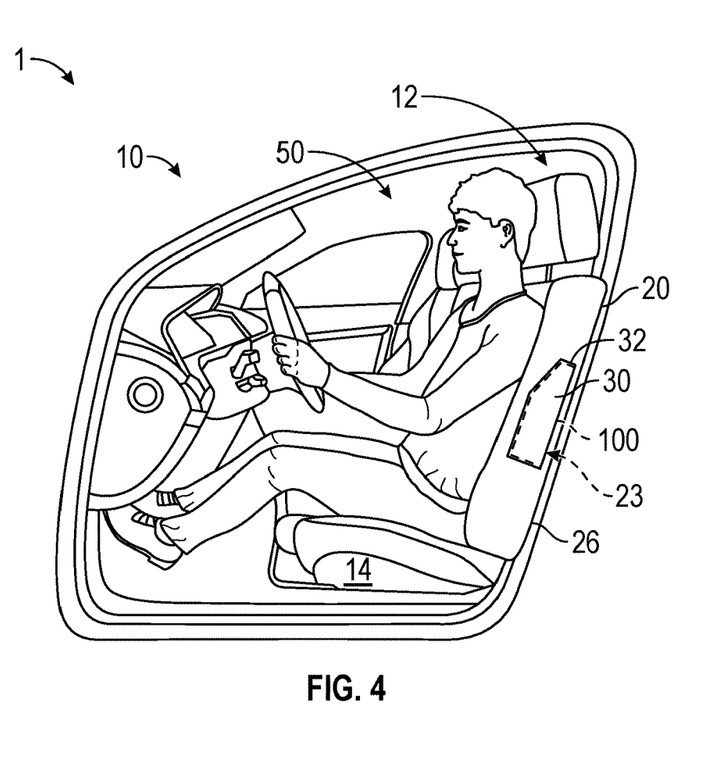
FIG. 4 is a side view of the portion of the vehicle and the side inflatable airbag assembly of FIGS. 1-3.

FIG. 4 is a side view of the portion of the vehicle 1 and the side inflatable airbag assembly 100 of FIGS. 1-3. The occupant 50 is seated in the seat 12 that defines the vehicle occupant position 10. The seat base 14 is shown for reference. In FIG. 4, the seat cover 26 covers the seat back 20. The side inflatable airbag assembly 100 is installed to a void 23 of the seat back 20 by mounting to the frame (see the frame 28 in FIG. 3) as described above. The seat cover 26 comprises an overlying portion 30 that overlies the side inflatable airbag assembly 100. The overlying portion 30 may comprise or be circumscribed by a sacrificial fail zone 32. The sacrificial fail zone 32 may be configured to permit deployment of the inflatable airbag cushion (see the inflatable airbag cushion 108 in FIGS. 1-3). By way of example without limitation, the overlying portion 30 may be configured to burst, separate, or otherwise expose the underlying side inflatable airbag assembly 100. The overlying portion 30 may, for example, be formed of a material biased or configured with perforations in such a way as to burst, or by another means known in the art to permit the overlying portion 30 to burst or rupture whereby the inflatable airbag cushion 108 may deploy. The overlying portion 30 may be circumscribed or partially circumscribed by a sacrificial fail zone 32. The sacrificial fail zone 32 may be configured with a tear seam, a series of perforations, a fabric bias, or another means known in the art whereby the sacrificial fail zone 32 may separate when the inflatable airbag cushion 108 exerts an appropriate degree of force to the underside of the overlying portion 30 whereby the inflatable airbag cushion 108 is permitted to deploy through the seat cover 26.

Figure 5:
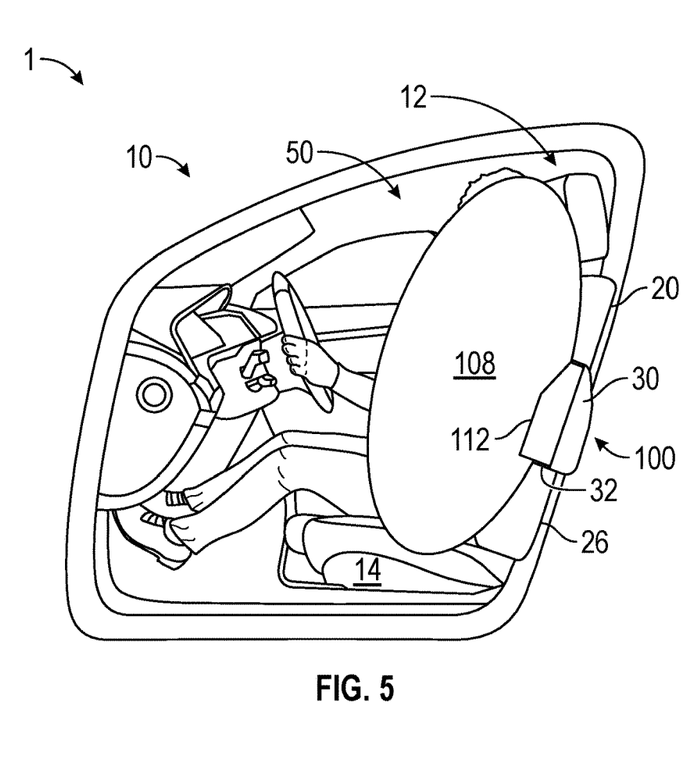
FIG. 5 is a side view of the portion of the vehicle having the side inflatable airbag assembly of FIGS. 1-4 with the inflatable airbag cushion deployed and at least partially inflated.

FIG. 5 is a side view of the portion of the vehicle 1 having the side inflatable airbag assembly 100 of FIGS. 1-4 with the inflatable airbag cushion 108 deployed and at least partially inflated. The vehicle occupant position 10, the seat 12, the seat base 14, the seat back 20, and the occupant 50 are shown for reference. The inflator (see the inflator 102 in FIGS. 1-3) has been triggered by an event, such as, e.g., a collision event, and has caused the inflatable airbag cushion 108 to at least partially inflate and deploy. As a result of the introduction of inflation gas from the inflator 102 into the inflatable airbag cushion 108, the inflatable airbag cushion 108 has expanded to exert a sufficient force against the subtotal enclosure to cause the sacrificial fail point (see the subtotal enclosure 110, the sacrificial fail point 126 in FIG. 1) to fail; and to exert a sufficient force against the overlying portion 30 of the seat cover 26 to cause the sacrificial fail zone 32 to fail; and to occupy an area between the occupant 50 and side portions (e.g., door, door post, etc.) of the vehicle 1 so as to prevent or mitigate injury to the occupant 50.

An event, such as a collision event, may trigger deployment of the inflatable airbag cushion 108 from the side inflatable airbag assembly 100. More particularly, an event may trigger the inflator (see the inflator 102 in FIGS. 1-3) to inflate the inflatable airbag cushion 108. The inflator may deliver inflation gas to the inflatable airbag cushion 108 to cause the inflatable airbag cushion 108 to deploy and inflate to protect, at least partially, the occupant 50 from injury resulting from the triggering event. As the inflatable airbag cushion 108 begins to inflate, the inflatable airbag cushion 108 may exert a force against the subtotal enclosure (see the subtotal enclosure 110 in FIGS. 1-3). The force exerted against the subtotal enclosure may cause the sacrificial fail point of the closure (see the sacrificial fail point 126 in FIG. 1, and the closure 122 of FIGS. 1 and 2A) to fail. As the inflatable airbag cushion 108 continues to inflate, the inflatable airbag cushion 108 may exert force against an inward surface of the overlying portion 30 of the seat cover 26. In some embodiments, the force exerted against the overlying portion 30 by the inflating inflatable airbag cushion 108 may cause the sacrificial fail zone 32 to fail or separate from the seat cover 26 to permit the overlying portion 30 of the seat cover 26 to at least partially expose the inflatable side airbag assembly 100 whereby the inflatable airbag cushion 108 is permitted to deploy through the seat cover 26. In some embodiments, the force exerted against the overlying portion 30 of the seat cover may cause the overlying portion 30 of the seat cover 26 to rupture, fail, or otherwise separate to at least partially expose the inflatable side airbag assembly 100 whereby the inflatable airbag cushion 108 is permitted to deploy through the seat cover 26.

Figure 6:
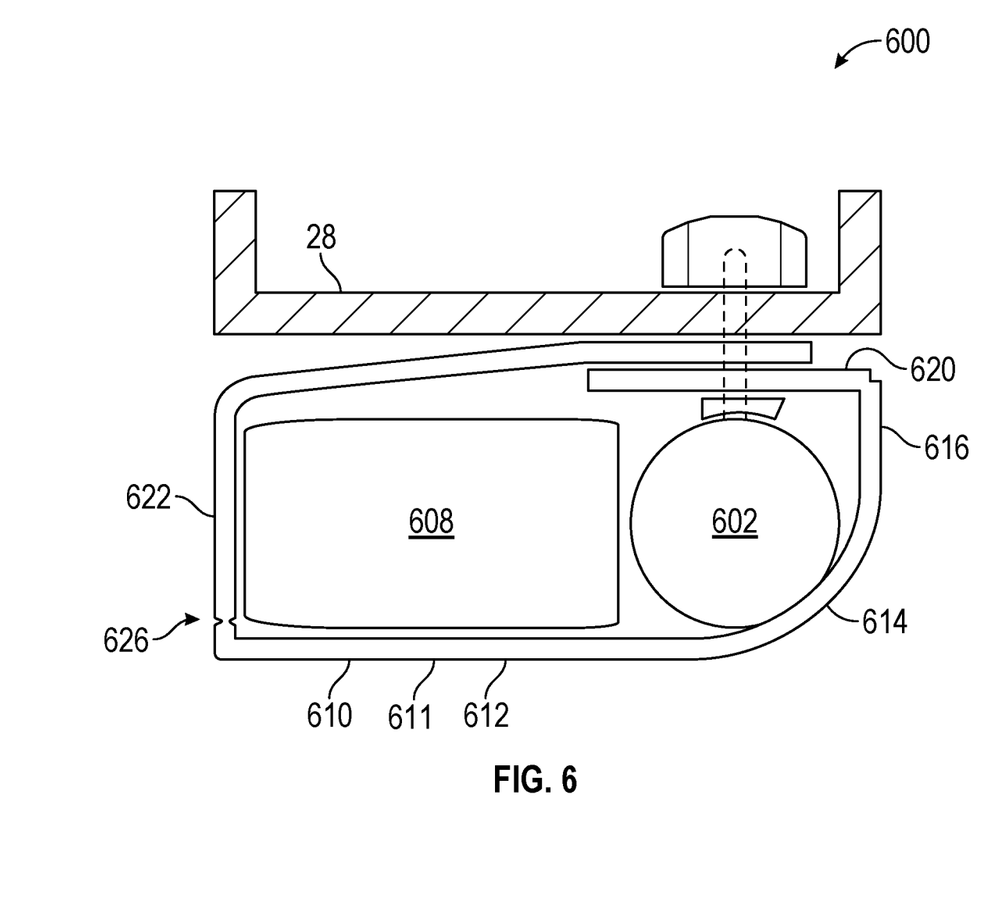
FIG. 6 is a top view of an inflatable side airbag assembly, according to an embodiment of the present disclosure, and having a parabolic panel.

FIG. 6 depicts an embodiment of an inflatable side airbag assembly 600 that resembles the inflatable side airbag assembly 100 described above in certain respects. Accordingly, like features are designated with like reference numerals, with the leading digits incremented to "6." For example, the embodiment depicted in FIG. 6 includes an inflator 602 that may, in some respects, resemble the inflator 102 of FIGS. 1-3. Relevant disclosure set forth above regarding similarly identified features thus may not be repeated hereafter. Moreover, specific features of the inflatable side airbag assembly 100 and related components shown in FIGS. 1-5 may not be shown or identified by a reference numeral in the drawings or specifically discussed in the written description that follows. However, such features may clearly be the same, or substantially the same, as features depicted in another embodiment and/or described with respect to such embodiment. Accordingly, the relevant description of such features applies equally to the features of the inflatable side airbag assembly 600 and related components depicted in FIG. 6. Any suitable combination of the features, and variations of the same, described with respect to the inflatable side airbag assembly 100 can be employed with the inflatable side airbag assembly 600 and related components in FIG. 6, and vice versa. This pattern of disclosure applies equally to further embodiments depicted in subsequent figures and described hereafter, wherein the leading digits may be further incremented.

FIG. 6 is a top view of an inflatable side airbag assembly 600 according to an embodiment of the present disclosure and having a parabolic panel 611. The frame 28 of a seat back (see the seat back 20 in FIGS. 3-5), the inflator 602, and the inflatable airbag cushion 608 in a packaged state are shown for reference. In the embodiment of FIG. 6, the subtotal enclosure 610 comprises a parabolic panel 611, the mounting panel 620, and the closure 622. The sacrificial fail point 626 of the closure 622 is shown for reference. The parabolic panel 611 comprises a lateral portion 612 and a rear portion 616. The lateral portion 612 may be in many respects similar to the lateral panel 112 of FIGS. 1-3. The rear portion 616 may be in many respects similar to the rear panel 116 of FIGS. 1-3. The parabolic panel 611 further comprises a curved portion 614 disposed between the rear portion 616 and the lateral portion 612.

In one embodiment, the parabolic panel 611 may be formed as a single contiguous component having a generally uniform degree of elasticity and/or plasticity throughout. In one embodiment, the parabolic panel 611 may be formed of multiple materials and may have generally uniform or varying degrees of elasticity and/or plasticity. The curved portion 614 of the parabolic panel 611 may allow a degree plasticity whereby, upon activation of the inflatable side airbag assembly 600, failure of the sacrificial fail point 626 (caused by expansion of the inflatable airbag cushion 608), may allow the lateral portion 612 to at least partially articulate outward in a somewhat spring-like manner. Furthermore, the parabolic panel 611 may be configured to provide a degree of support of the overlying portion of the seat cover to avoid visible indicators of the presence of the inflatable side airbag assembly 600 (sometimes called "read-through") (see the overlying portion 30, seat cover 26 in FIGS. 4 and 5).

In the present disclosure, reference is made to an inflatable side airbag assembly; however, this is for convenience of the disclosure and not by way of limitation. An embodiment of the disclosed subtotal enclosure may be employed with an inflatable airbag system installed to various locations of a vehicle and has particular utility when the inflatable airbag system is installed behind or beneath a generally soft or pliant covering generally similar to a seat cover. For example, an embodiment of the subtotal enclosure may be used with an inflatable airbag system installed behind a headliner of a vehicle; or may be suitable for use with an inflatable frontal airbag system installed behind a seat cover of a seat of a vehicle occupant position disposed forward of another vehicle occupant position (e.g., an inflatable frontal airbag system installed in a rearward portion of a front seat for protection of an occupant of a rear seat); etc.

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

Unless otherwise stated, all ranges include both endpoints and all numbers between the endpoints.

The "vehicle occupant position" refers to a location in which an occupant is generally disposed while in a vehicle that is not in a collision condition (e.g., while parked or traveling normally). The vehicle occupant position may comprise or be defined by a seat and a footwell, etc. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A cover of an inflatable airbag assembly to be mounted at a seat of a vehicle, the cover comprising:
    a mounting panel to mount the inflatable airbag assembly at a seat frame of the seat of the vehicle;
    a lateral panel coupled to the mounting panel, the lateral panel to be disposed facing an outer lateral surface of the seat of the vehicle and to cover a void in the seat, the void to accommodate an inflatable airbag in a packaged state, the lateral panel providing an outward facing surface comprising a material with a degree of rigidity and a degree of elasticity,
    wherein the mounting panel and the lateral panel form a subtotal enclosure to support the inflatable airbag in the packaged state within the seat, and
    wherein the lateral panel is configured to at least partially articulate laterally outward relative to the seat frame away from the mounting panel to allow the inflatable airbag to deploy from the void in the seat; and
    a closure to couple between the mounting panel and the lateral panel and to retain the inflatable airbag in the packaged state until deployment.

2. The cover of claim 1, wherein the closure is to releasably secure the inflatable airbag to at least one of the lateral panel and the mounting panel.

3. The cover of claim 2, wherein a first end of the closure is coupled at an edge of the lateral panel.

4. The cover of claim 2, wherein a second end of the closure is configured to couple to at least one of the mounting panel and a mounting component of an inflator of the inflatable airbag assembly.

5. The cover of claim 2, wherein the closure is configured to decouple to permit the lateral panel to articulate in an outward direction relative to the seat, and
    wherein outward articulation of the lateral panel permits deployment of the inflatable airbag.

6. The cover of claim 2, wherein the lateral panel and the closure are formed as a unitary component comprised of a contiguous material.

7. The cover of claim 2, wherein the closure comprises a sacrificial fail point.

8. The cover of claim 1, wherein the lateral panel and the mounting panel are formed as a unitary component comprised of a contiguous material,
    wherein the lateral panel couples to the mounting panel at a flexible fold of the contiguous material, the flexible fold configured to permit the lateral panel to articulate outward away from the mounting panel.

9. The cover of claim 1, further comprising a rear panel to couple between the lateral panel and the mounting panel.

10. The cover of claim 9, wherein the rear panel and the mounting panel are formed as a unitary component comprised of a contiguous material.

11. The cover of claim 9, wherein the rear panel and the lateral panel are formed as a unitary component comprised of a contiguous material.

12. The cover of claim 11, wherein a flexible fold of the contiguous material between the lateral panel and rear panel permits outward articulation of the lateral panel away from the mounting panel.

13. The cover of claim 1, wherein the cover is configured to cover an inflatable airbag assembly comprising an inflatable airbag module comprising the inflatable airbag and an inflator, and
    wherein the mounting panel and the lateral panel form a subtotal enclosure to support the inflatable airbag module within the seat.

14. An inflatable airbag assembly to be mounted in a seat of a vehicle, the assembly comprising:
    an inflatable airbag module comprising an inflator and an inflatable airbag cushion in a packaged state; and
    a subtotal enclosure to at least partially enclose the inflatable airbag module and comprising:
        a first panel configured to receive a mounting stud of the inflator, the stud to mount the inflatable airbag assembly to a seat frame of a seat and within a void of the seat, wherein the void is disposed in a lateral portion of the seat toward a lateral surface of the seat;
        a second panel coupled at a first edge to the first panel and configured to cover the void of the seat,
        the second panel formed of a material with a degree of rigidity and a degree of elasticity to open laterally outward relative to the seat frame and away from the first panel to permit the inflatable airbag cushion to deploy from the void of the seat; and
        a closing member coupling between a second edge of the second panel and a portion of the first panel, the closing member comprising a strap coupling between the first and second panels to retain the inflatable airbag cushion in the packaged state until deployment, wherein at least a portion of the inflatable airbag cushion, in the packaged state, is disposed between the first and second panels.

15. The inflatable airbag assembly of claim 14, wherein the first panel and the second panel are formed of a unitary component comprised of a contiguous material, and wherein the unitary component comprises a flexible fold defining the first edge of the second panel, wherein the second panel is configured to articulate outward.

16. The inflatable airbag assembly of claim 14, wherein the closing member and the second panel are formed of a unitary component comprised of a contiguous material.

17. The inflatable airbag assembly of claim 14, wherein the closing member comprises a sacrificial fail point configured to cause the closing member to separate to permit deployment of the inflatable airbag cushion.

18. The inflatable airbag assembly of claim 14, wherein the closing member is configured to couple to the mounting stud of the inflator.

19. The inflatable airbag assembly of claim 14, wherein the closing member further comprises a flexible wrapper to substantially enclose the inflatable airbag cushion in the packaged state between the first and second panels, and wherein the flexible wrapper retains the inflatable airbag cushion in the packaged state prior to deployment.

* * * * *